(12) United States Patent
Wu

(10) Patent No.: US 10,913,504 B2
(45) Date of Patent: Feb. 9, 2021

(54) SMART LOCK OF BICYCLE

(71) Applicant: MICROPROGRAM INFORMATION CO., LTD., Taichung (TW)

(72) Inventor: Teng Yan Wu, Taichung (TW)

(73) Assignee: Microprogram Information Co., Ltd., Taichung (TW)

( * ) Notice: Subject to any disclaimer, the term of this patent is extended or adjusted under 35 U.S.C. 154(b) by 324 days.

(21) Appl. No.: 16/152,077

(22) Filed: Oct. 4, 2018

(65) Prior Publication Data

US 2019/0152549 A1 May 23, 2019

(30) Foreign Application Priority Data

Nov. 21, 2017 (TW) ............................. 106140206 A

(51) Int. Cl.
| | | |
|---|---|---|
| *B62H 5/00* | (2006.01) | |
| *B62H 3/02* | (2006.01) | |
| *B62H 3/00* | (2006.01) | |
| *E05B 15/00* | (2006.01) | |
| *E05B 47/00* | (2006.01) | |

(52) U.S. Cl.
CPC ............... *B62H 5/00* (2013.01); *B62H 3/00* (2013.01); *B62H 3/02* (2013.01); *B62H 5/003* (2013.01); *E05B 15/0046* (2013.01); *E05B 47/0001* (2013.01); *B62H 2003/005* (2013.01)

(58) Field of Classification Search
CPC ... E05B 15/0046; E05B 47/0001; B62H 5/00; B62H 5/003; B62H 3/00; B62H 3/02; B62H 2003/005
USPC .................................................. 70/233–236
See application file for complete search history.

(56) References Cited

U.S. PATENT DOCUMENTS

| | | | | |
|---|---|---|---|---|
| 7,726,160 B2* | 6/2010 | Gagosz | .................. | B62H 5/003 70/233 |
| 8,678,205 B2* | 3/2014 | Mercat | ...................... | B62M 6/40 211/5 |
| 10,641,014 B2* | 5/2020 | Tepper | ...................... | G07C 9/33 |
| 2009/0201127 A1* | 8/2009 | Stobbe | .................... | G07F 17/10 340/5.6 |
| 2011/0148346 A1* | 6/2011 | Gagosz | .................... | B62M 6/40 320/103 |

FOREIGN PATENT DOCUMENTS

| | | | | | |
|---|---|---|---|---|---|
| DE | 102007052911 A1 * | 1/2009 | | ............... | B62H 3/00 |
| FR | 3082822 A1 * | 12/2019 | | ......... | G07F 17/0057 |
| WO | WO-2015077869 A1 * | 6/2015 | | ............... | B62H 3/02 |
| WO | WO-2017020134 A1 * | 2/2017 | | ............... | B62H 3/00 |

* cited by examiner

*Primary Examiner* — Suzanne L Barrett
(74) *Attorney, Agent, or Firm* — Wang Law Firm, Inc.

(57) ABSTRACT

A smart lock of a bicycle includes a bicycle locking apparatus and a dock locking apparatus. The bicycle locking apparatus works with a key to lock the bicycle without dock, and the dock locking apparatus works with a dock to lock the bicycle to the dock. The bicycle locking apparatus includes a gear, a locking member, and a driving module. The locking member has a locking tooth portion, the driving module moves the locking member to engage and disengage the locking tooth portion of the locking member with an engaging portion of the key. The dock locking apparatus has a locking latch and a stop member. The driving module moves the locking member to let the stop member against or away from the locking latch to lock or unlock the bicycle to the dock.

11 Claims, 6 Drawing Sheets

SMART LOCK OF BICYCLE

BACKGROUND OF THE INVENTION

1. Technical Field

The present invention relates to a bicycle, and more particularly to a smart lock of a bicycle.

2. Description of Related Art

A conventional bicycle rental system without rental station provided a plurality of rental bicycles to be rented and returned anyplace. Each rental bicycle is provided with a bicycle lock to lock the rental bicycle after it is parked, and send a return signal to a rental system to complete a return process.

The conventional bicycle lock has a cable with a key at a distal end thereof, and a key connected to the bicycle lock. One may pull the cable to run through the tire, and then insert the key back to the bicycle lock to lock the rental bicycle. At this time, the rental bicycle is locked, and one may take the key to unlock the bicycle lock later. A disadvantage of the conventional bicycle lock is that anyone may lift and move the rental bicycle even though the rental bicycle is locked. In addition, the key might be removed or damaged on purpose.

BRIEF SUMMARY OF THE INVENTION

In view of the above, the primary objective of the present invention is to provide a smart lock of a bicycle, which may lock and return a bicycle with or without a dock.

The secondary objective of the present invention is to provide a smart lock of a bicycle, which has a simple structure, and has a good locking effect.

In order to achieve the objectives of the present invention, a smart lock of a bicycle includes a bicycle locking apparatus, which works with a key. The bicycle locking apparatus includes a gear, a locking member, and a driving module. The locking member has a locking tooth portion, the driving module moves the locking member to engage and disengage the locking tooth portion of the locking member with an engaging portion of the key.

When the key is inserted into the smart lock, the engaging portion of the key engages the gear and drives the gear, and the key activates the driving module to move the locking member for engaging the locking tooth portion with the gear, so that the bicycle is locked. When the driving module moves the locking member to disengage the locking tooth portion with the gear, the bicycle is unlocked and the key is able to be moved away from the smart lock.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

Figure 1:
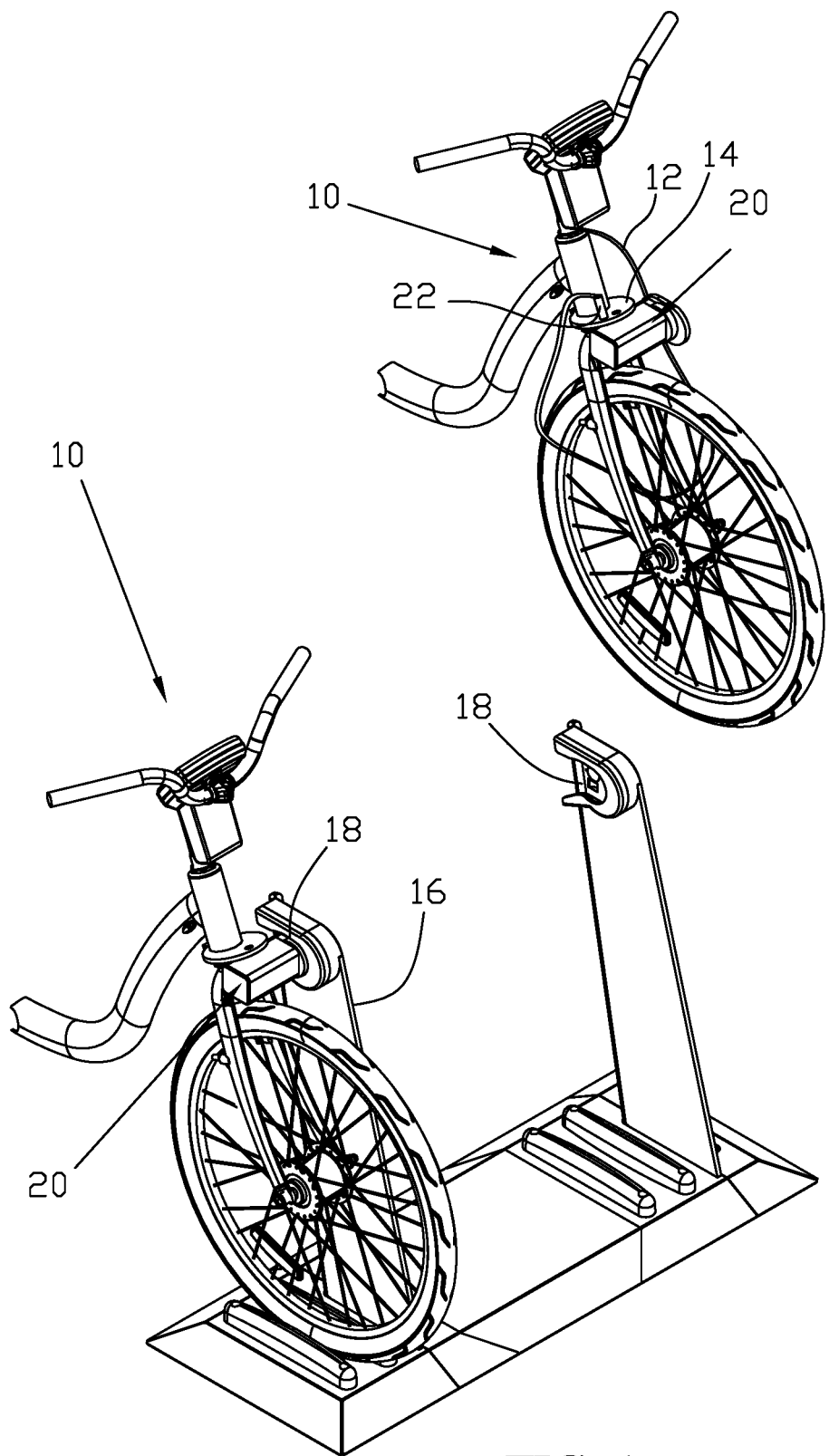
FIG. 1 is a perspective view of a preferred embodiment of the present invention, showing the rental bicycle being locked to the dock.

FIG. 1 shows a bicycle 10 equipped with a smart lock 20 of the preferred embodiment. The bicycle 10 is provided with a cable 12 with a key 22 at a distal end thereof. The cable 12 runs through a tire of the bicycle 10, and then the key 22 is inserted into a bore of a locking board 14 of the bicycle 10 and into the smart lock 20 to lock the bicycle 10. An alternate of locking the bicycle 10 is that the bicycle 10 is parked by a dock 16 to engage the smart lock 20 of the bicycle 10 with a dock recess 18 of the dock 16.

Figure 2:
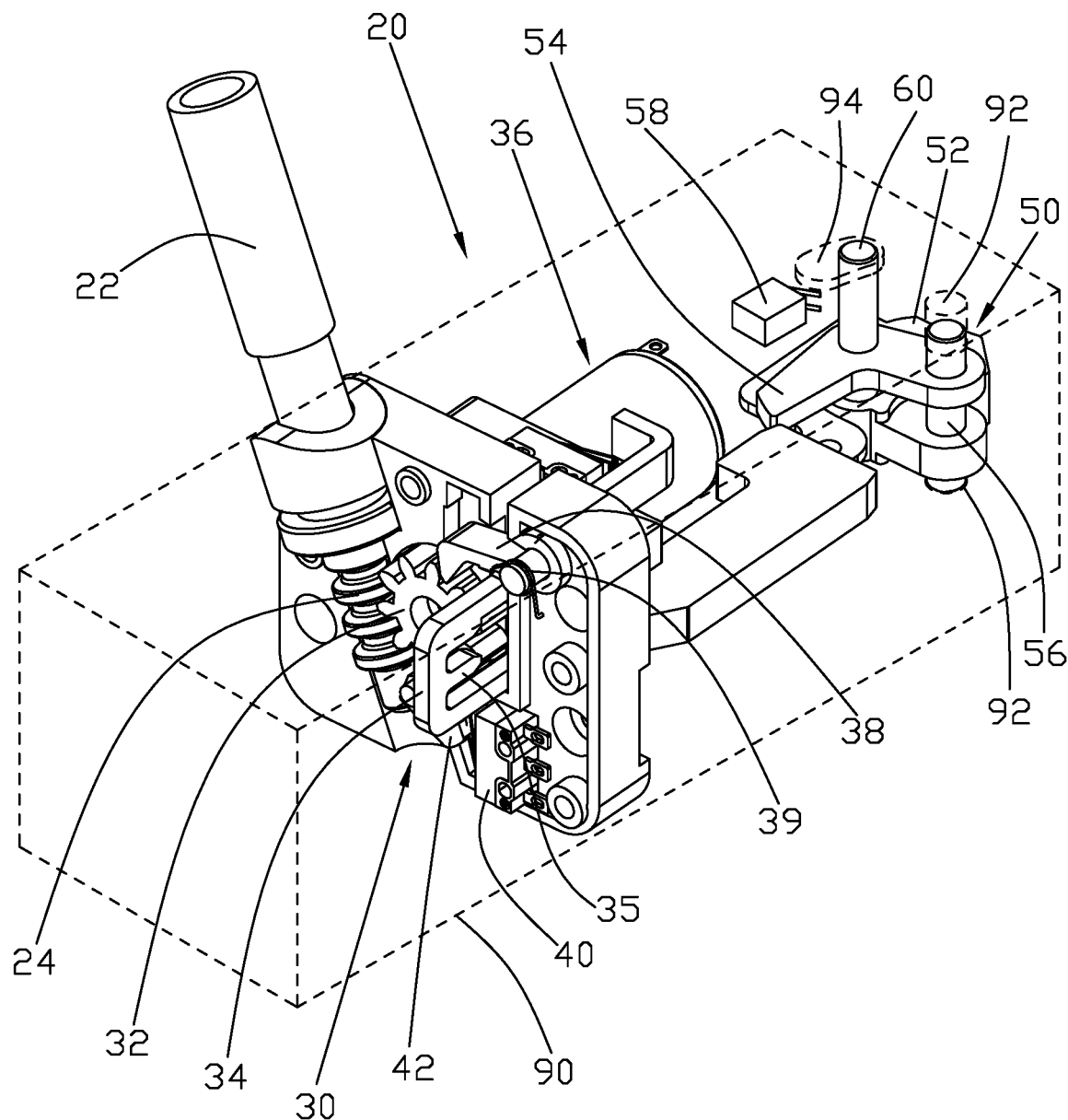
FIG. 2 is a perspective view of the preferred embodiment of the present invention.

As shown in FIG. 2, the smart lock 20 has a case 90, in which a bicycle locking apparatus 30 and a dock locking apparatus 50 are provided. The bicycle locking apparatus 30 is worked with the key 22 of the cable 12, and the dock locking apparatus 50 is worked with the dock 16.

Figure 3:
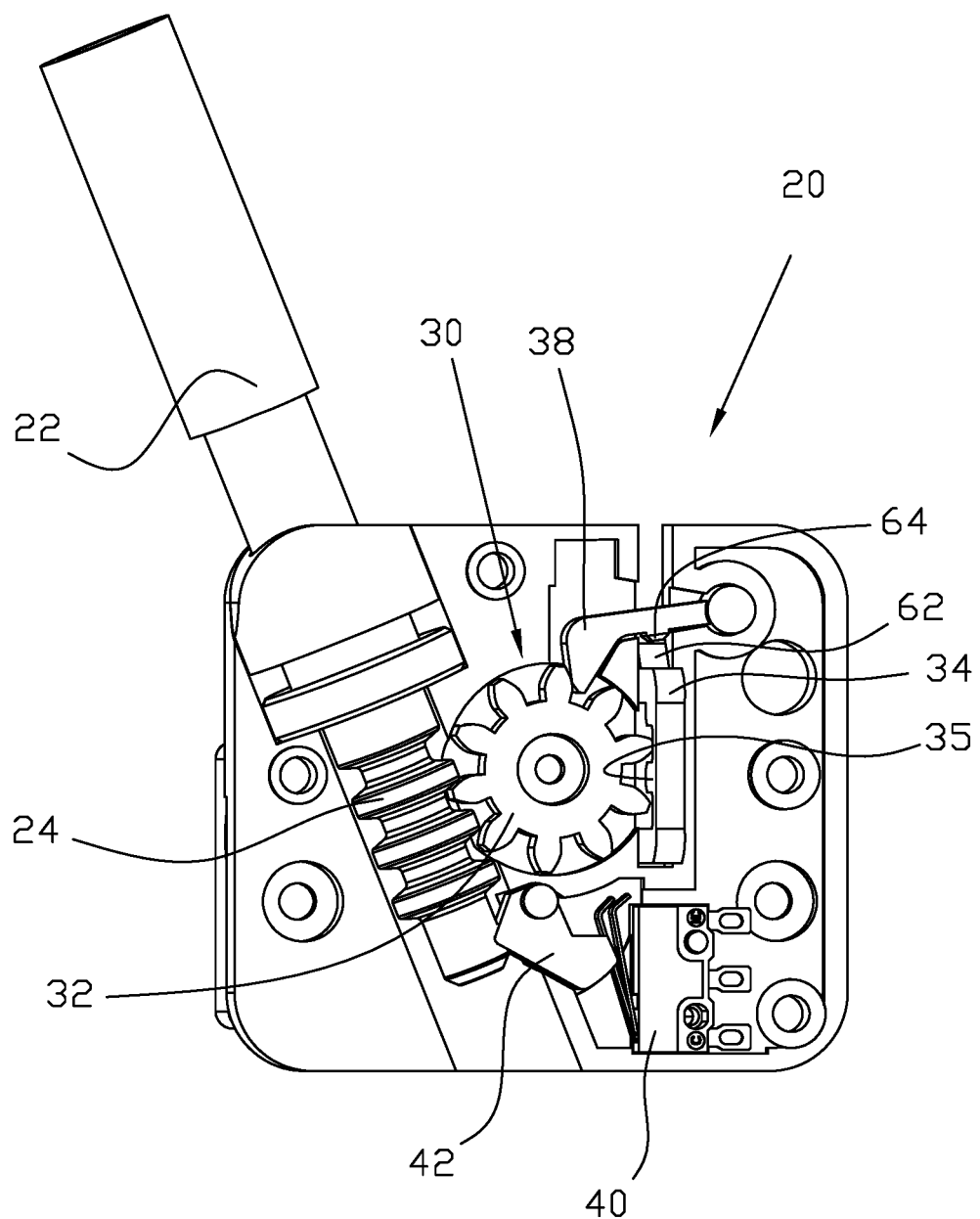
FIG. 3 is a front view of the preferred embodiment of the present invention, showing the bicycle locking apparatus.

As shown in FIG. 2 and FIG. 3, the key 22 has an engaging portion 24. The bicycle locking apparatus 30 has a gear 32, a locking member 34, and a driving module 36. The locking member 34 has a locking tooth portion 35. The locking member 34 is moved by the driving module 36 to engage and disengage the locking tooth portion 35 and the gear 32. A ratchet member 38 is pivoted to engage and disengage the gear 32. The ratchet member 38 is adjacent to the locking member 34. A spring 39 is provided to urge the ratchet member 38 to normally engage the gear 32.

The locking member 34 further has a first switch 40 and a first activating member 42. The first switch 40 is electrically connected to the driving module 36, and the first activating member 42 is provided in a channel into which the key 22 is inserted. As a result, the first activating member 42 is pressed by the key 22 to activate the driving module 36 through the first switch 40.

Figure 4:
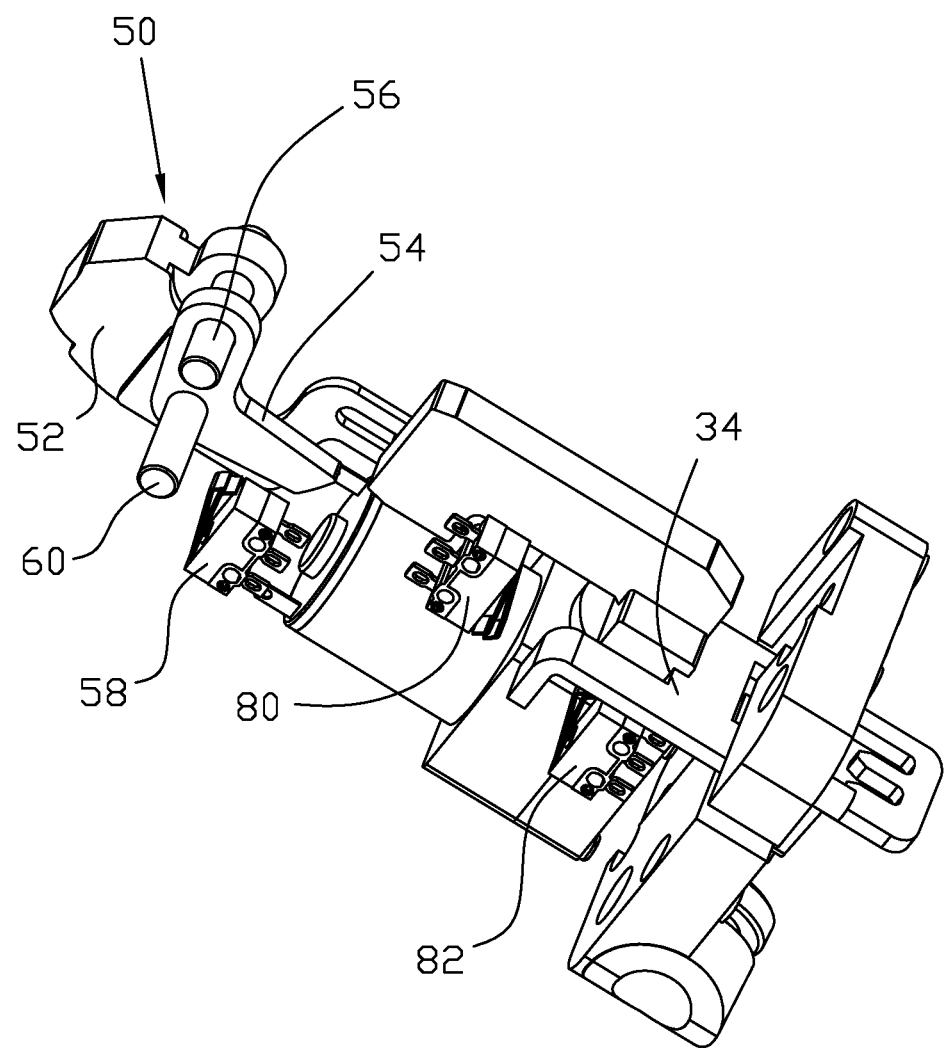
FIG. 4 is a perspective view of the preferred embodiment of the present invention, showing dock locking apparatus.

As shown in FIG. 2 and FIG. 4, the dock locking apparatus 50 has a locking latch 52 and a stop member 54. The stop member 54 and the locking latch 52 are fixed to a post 56, and the post 56 has opposite ends received in recesses 92 on an interior side of the case 90 to pivot the stop member 54 and the locking latch 52 on the case 90. A spring 53 is provided in the case 90 to urge the stop member 54 and the locking latch 52. The dock locking apparatus 50 further has a second switch 58 and a second activating member 60. The second activating member 60 is a post passing through the stop member 54 and the locking latch 52. An end of the second activating member 60 is received in a curved slot 94 on the interior side of the case 90 to guide a swing of the stop member 54 and the locking latch 52. The second activating member 60 is associated with the stop member 54, and the second switch 58 is associated with the second activating member 60. Therefore, the swing of the stop member 54 may move the second activating member 60 to switch the second switch 58.

As shown in FIG. 3, the locking member 34 has a first protrusion 62, and the ratchet member 38 has a second protrusion 64. The first protrusion 62 abuts against the second protrusion 64 to move the ratchet member 38 away from a center of the gear 32 and disengage the ratchet member 38 with the gear 32 when the locking member 34 is moved toward the ratchet member 38. The spring urges ratchet member 38 to engage the gear 32 when the locking member 34 is moved back and the first protrusion 62 is not against the second protrusion 64.

Figure 5:
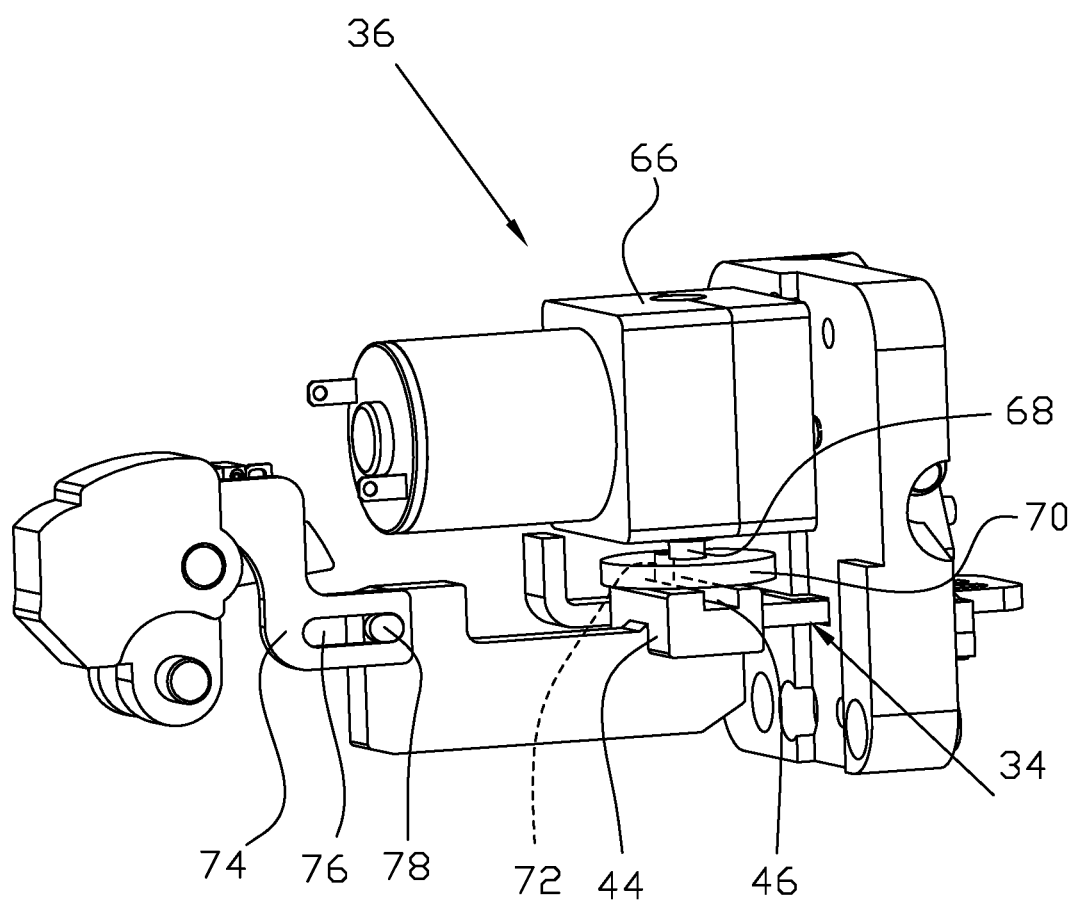
FIG. 5 is a perspective view of the preferred embodiment of the present invention, showing the driving module and the locking member.

As shown in FIG. 5, the locking member 34 is provided with a guiding member 44, on which a guiding slot 46 is provided. The driving module 36 includes a driving member 66, an output shaft 68, and a plate 70. The plate 70 is fixed to an end of the output shaft 68. An end of a guiding shaft 72 is fixed to the plate 70 at a position away from a center of the plate 70, and an opposite end of the guiding shaft 72 is received in the guiding slot 46 of the guiding member 44. In the present embodiment, the driving member 66 includes a motor and a gearbox. A restricting member 74 is provided beside the locking member 34, on which a linear slot 76 is provided, and the locking member 34 is provided with a post 78 engaging the linear slot 76.

As shown in FIG. 4, the present invention further includes a first stop switch 80 and a second stop switch 82 beside the locking member 34, both of which are electrically connected to the driving module 36. The first and the second stop switch 80, 82 provide the driving module 36 a stop signal to stop the driving module 36, respectively.

When a user inserts the key 22 into the smart lock 20, the key 22 presses the first activating member 42, and the first activating member 42 activates the first switch 40 to let the driving module 36 rotates the plate 70 and the guiding shaft 72 moves in the guiding slot 46. As a result, the locking member 34 is moved with the post 78 moving in the linear slot 76. Therefore, the engaging portion 24 of the key 22 engages the gear 32, the locking tooth portion 35 of the locking member 34 engages the gear 32, and the ratchet member 38 is moved toward the gear 32. Furthermore, the locking member 34 activates the first stop switch 80 to stop the driving module 36.

When the smart lock 20 receives an unlock signal, the plate 70 of the driving module 36 is turned reversely, and the guiding shaft 72 is moved in the guiding slot 46 that may move the locking member 34 to disengage the locking tooth portion 35 of the locking member 34 with the gear 32 and move the ratchet member 38 away from the gear 32. As a result, the locking member 34 presses the second stop switch 82 to stop the locking member 34, and the key 22 is able to be pulled out from the smart lock 20.

Figure 6:
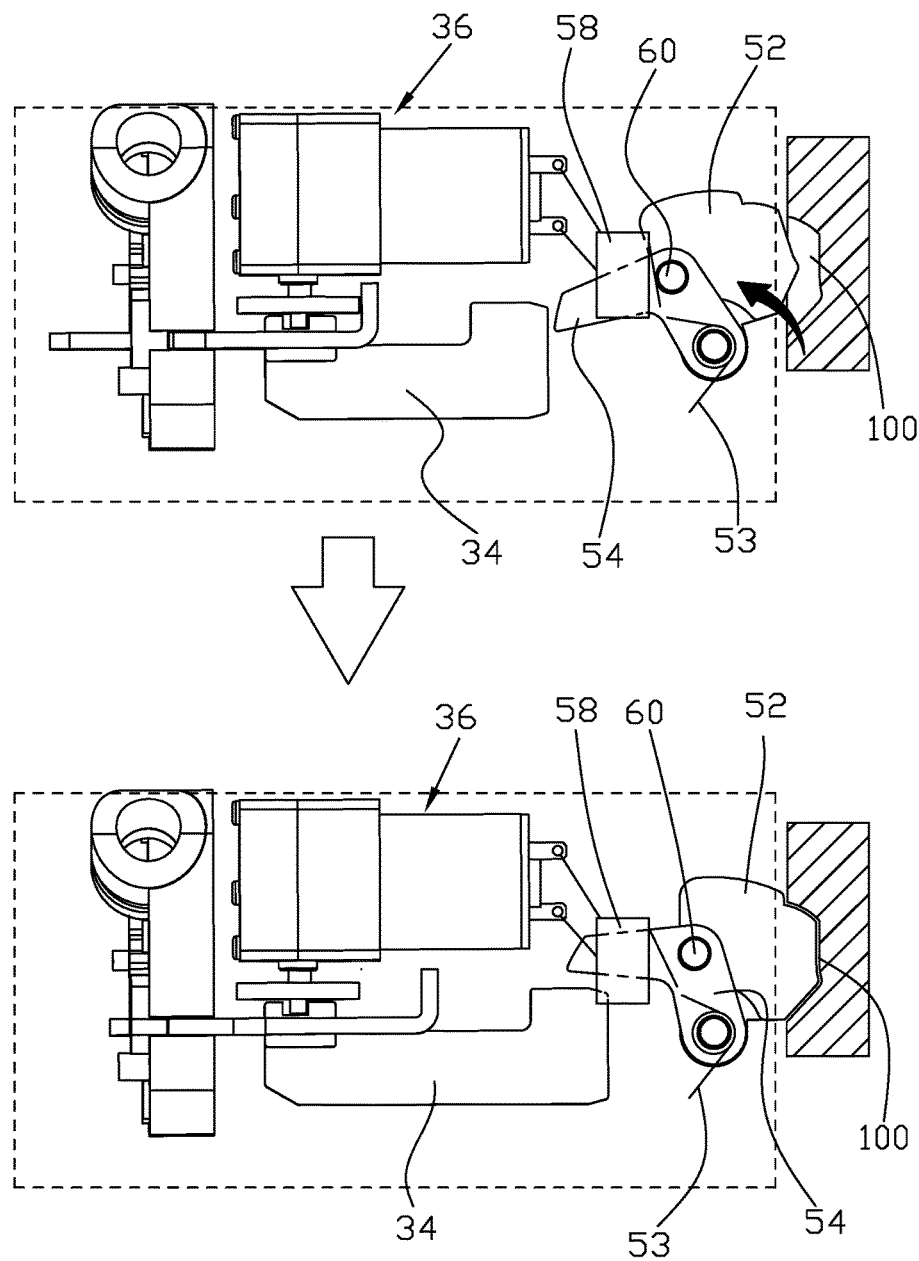
FIG. 6 is a sketch diagram of the preferred embodiment of the present invention, showing the action of the dock locking apparatus.

As shown in FIG. 6, when the bicycle 10 is being locked to a dock 16, the locking latch 52 and the stop member 54 are swung to make the second activating member 60 of the stop member 54 press the second switch 58 and the locking latch 52 enter a bore 100 of the dock 16. At this time, the second switch 58 sends the driving module 36 a signal to stop it, and the locking member 34 is moved to a predetermined position by the stop member 54 to be stopped. Therefore, the locking latch 52 and the stop member 54 are unable to be turned when a user moves the bicycle 10, and the bicycle 10 is locked to the dock 16.

The bicycle 10 is unlocked (see the upper figure of FIG. 6) when the driving module 36 moves the locking member 34 away from the stop member 54 (i.e. the locking member 34 is moved away from the predetermined position), so that the locking latch 52 and the stop member 54 are moved back by the spring 53.

In conclusion, the smart lock 20 of the present invention may lock the bicycle 10 with or without the dock 16 to provide the bicycle 10 to be rented and returned in different ways. The smart lock of the present invention has a mechanical locking mode that provides the smart lock a simple structure and a strong locking effect.

It must be pointed out that the embodiments described above are only some preferred embodiments of the present invention. All equivalent structures which employ the concepts disclosed in this specification and the appended claims should fall within the scope of the present invention.

What is claimed is:

1. A smart lock of a bicycle, comprising:
a bicycle locking apparatus, which works with a key, including a gear, a locking member, and a driving module, wherein the locking member has a locking tooth portion, and the driving module moves the locking member to engage and disengage the locking tooth portion of the locking member with an engaging portion of the key;
wherein when the key is inserted into the smart lock, the engaging portion of the key engages the gear and drives the gear, and the key activates the driving module to move the locking member for engaging the locking tooth portion with the gear, so that the bicycle is locked; when the driving module moves the locking member to disengage the locking tooth portion with the gear, the bicycle is unlocked and the key is able to be moved away from the smart lock;
wherein the driving module has a guiding shaft engaging the locking member, whereby the locking member is moved through the guiding shaft when the driving module moves the guiding shaft.

2. The smart lock of the bicycle of claim 1, further comprising a dock locking apparatus, which works with a dock, including a locking latch and a stop member, both of which are pivoted through a post, wherein the locking latch engages the dock; when the driving module moves the locking member through the guiding shaft to a predetermined position in association with the stop member to stop the locking latch and the stop member, the bicycle is locked; when the driving module moves the locking member through the guiding shaft away from the predetermined position and the locking latch and the stop member are free to move, the bicycle is unlocked.

3. The smart lock of the bicycle of claim 1, wherein the bicycle locking apparatus further includes a ratchet member and a spring urging the ratchet toward the gear; the bicycle is locked when the ratchet member is moved toward a center of the gear, and the bicycle is unlocked when the ratchet member is moved away from the center of the gear.

4. The smart lock of the bicycle of claim 3, wherein the locking member has a first protrusion, and the ratchet member has a second protrusion; the first protrusion abuts against the second protrusion to move the ratchet member away from the center of the gear when the locking member is moved; the first protrusion separates from the second protrusion and the ratchet member is moved toward the center of the gear by the spring when the locking member is moved reversely.

5. The smart lock of the bicycle of claim 1, wherein the locking member has a guiding member, on which a guiding slot is provided; the driving module includes a driving member, an output shaft, and a plate; the output shaft has opposite end connected to the driving member and the plate, so that the plate is turned by the driving member; an end of the guiding shaft is fixed to the plate at a position away from a center of the plate, and an opposite end of the guiding shaft is received in the guiding slot of the guiding member.

6. The smart lock of the bicycle of claim 1, wherein the driving module further includes a restricting member; the restricting member is provided with a linear slot in association with the locking member; the locking member has a post engaging the linear slot.

7. The smart lock of the bicycle of claim 5, wherein the driving module further includes a restricting member; the restricting member is provided with a linear slot in association with the locking member; the locking member has a post engaging the linear slot.

8. The smart lock of the bicycle of claim 1, wherein the bicycle locking apparatus further includes a first switch and a first activating member; the first switch is electrically connected to the driving module, and the first activating member is provided in a channel, into which the key is inserted; the first activating member is pressed by the key when the key is inserted into the channel to start the driving module through the first switch.

9. The smart lock of the bicycle of claim 1, wherein the dock locking apparatus further includes a first stop switch electrically connected to the driving module; the locking member is moved to press the first stop switch so as to stop the driving module.

10. The smart lock of the bicycle of claim 1, wherein the dock locking apparatus further includes a second stop switch electrically connected to the driving module; the locking member is moved to press the second stop switch so as to stop the driving module.

11. The smart lock of the bicycle of claim 2, wherein the bicycle locking apparatus further includes a second switch and a second activating member; the second activating member is connected to the stop member to be moved with the stop member; the second switch is provided in a path of a movement of the second activating member and is electrically connected to the driving module; the second activating member presses the second switch to let the driving module move the locking member in association with the stop member.

* * * * *